(12) United States Patent
Zhuravlev et al.

(10) Patent No.: US 9,835,283 B2
(45) Date of Patent: Dec. 5, 2017

(54) POLYMERIC DEVICE TO PROTECT PIPE COUPLING

(71) Applicants: Alexey Yur'evich Zhuravlev, Moscow (RU); Grigory Vladimirovich Lomazov, Moscow (RU); Igor Vladimirovich Petrov, Msocow (RU)

(72) Inventors: Alexey Yur'evich Zhuravlev, Moscow (RU); Grigory Vladimirovich Lomazov, Moscow (RU); Igor Vladimirovich Petrov, Msocow (RU)

(73) Assignee: MPR S.R.L., Trento TN (IT)

(*) Notice: Subject to any disclaimer, the term of this patent is extended or adjusted under 35 U.S.C. 154(b) by 242 days.

(21) Appl. No.: 14/312,780

(22) Filed: Jun. 24, 2014

(65) Prior Publication Data
US 2014/0300098 A1    Oct. 9, 2014

Related U.S. Application Data

(63) Continuation of application No. PCT/RU2012/001079, filed on Dec. 18, 2012.

(30) Foreign Application Priority Data

Dec. 27, 2011 (RU) ................................ 2011153496

(51) Int. Cl.
| | | |
|---|---|---|
| *F16L 58/18* | (2006.01) |
| *F16L 15/00* | (2006.01) |
| *F16L 15/04* | (2006.01) |
| *F16L 17/00* | (2006.01) |
| *F16L 58/10* | (2006.01) |

(52) U.S. Cl.
CPC .......... *F16L 58/182* (2013.01); *F16L 15/001* (2013.01); *F16L 15/04* (2013.01); *F16L 17/00* (2013.01); *F16L 58/10* (2013.01)

(58) Field of Classification Search
CPC ....... F16L 15/001; F16L 15/003; F16L 15/04; F16L 15/08; F16L 58/182
See application file for complete search history.

(56) References Cited

U.S. PATENT DOCUMENTS

| | | | |
|---|---|---|---|
| 2,233,734 A * | 3/1941 | Ely ...................... | F16L 15/001 285/290.2 |
| 3,235,291 A | 2/1966 | Jacoby | |

(Continued)

FOREIGN PATENT DOCUMENTS

| | | |
|---|---|---|
| RU | 2135882 | 8/1999 |
| RU | 2389943 | 5/2010 |

*Primary Examiner* — James M Hewitt, II
(74) *Attorney, Agent, or Firm* — Lambert & Associates; Gary E. Lambert; David J. Connaughton, Jr.

(57) ABSTRACT

A polymeric device for protection of the connecting pipe coupling contains a stepped bushing having a medium part with an increased diameter and two lateral parts with a smaller outside diameters, which is installed between end faces of pipes with a conic thread, and connected by means of a coupling and having sealing rings made of an elastomer, which are on parts of the bushing with the small diameter. The device has an additional stepped bushing, and the first stepped bushing has a constant outside diameter and two parts with small and large internal diameters, and the second stepped bushing has a constant internal diameter and two parts with small and large diameters.

8 Claims, 1 Drawing Sheet

(56) References Cited

U.S. PATENT DOCUMENTS

| | | | | |
|---|---|---|---|---|
| 3,253,841 A * | 5/1966 | Ahmad | B29C 57/005 | 277/608 |
| 3,298,716 A * | 1/1967 | Taylor | B29C 57/005 | 285/369 |
| 3,472,533 A * | 10/1969 | Turner | F16L 15/003 | 285/258 |
| 3,479,059 A * | 11/1969 | Taylor | F16L 15/003 | 285/256 |
| 3,702,199 A * | 11/1972 | Brooks et al. | F16L 23/028 | 285/334.2 |
| 4,366,971 A * | 1/1983 | Lula | F16L 58/182 | 138/109 |
| 4,572,720 A * | 2/1986 | Rockenfeller | F16B 15/06 | 411/311 |
| 4,619,470 A * | 10/1986 | Overath | F16L 23/02 | 285/368 |
| 4,679,831 A * | 7/1987 | Kielminski | F16L 15/003 | 285/332.2 |
| 5,356,030 A * | 10/1994 | Budenbender | B65D 39/082 | 220/288 |
| 5,470,111 A | 11/1995 | Nelson et al. | | |
| 6,863,313 B1 * | 3/2005 | DeLange | E21B 17/042 | 285/329 |
| 2010/0237612 A1 * | 9/2010 | Matherne | E21B 17/042 | 285/333 |
| 2012/0248766 A1 * | 10/2012 | Schwalbach | F16L 58/182 | 285/332.3 |

* cited by examiner

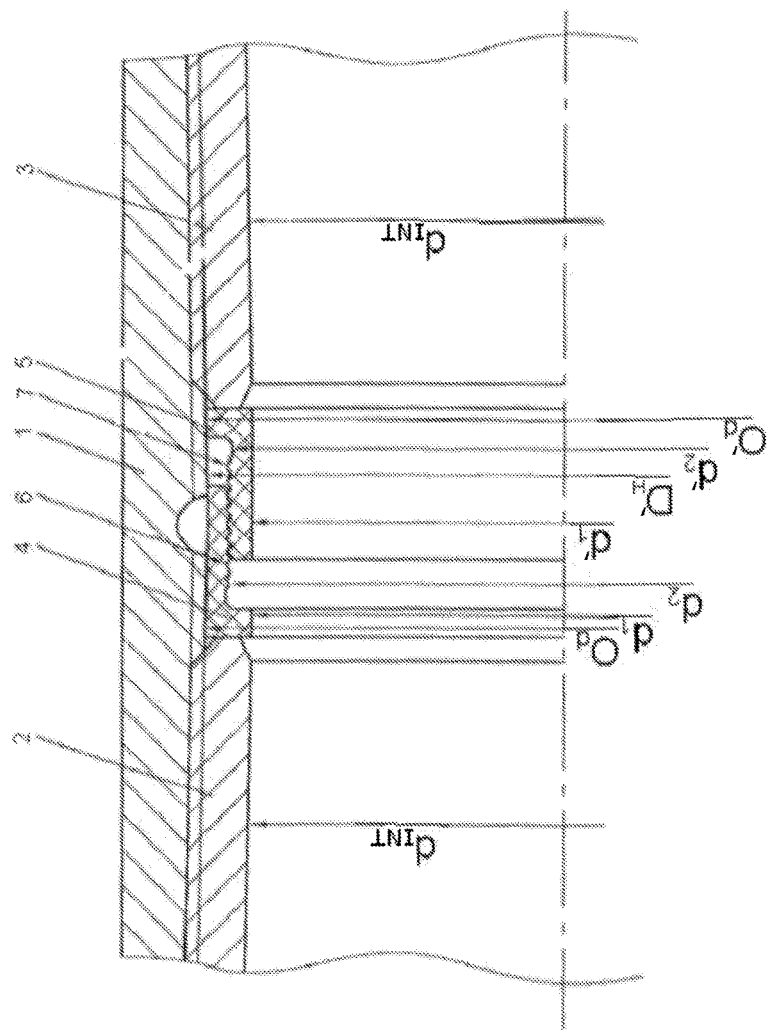

POLYMERIC DEVICE TO PROTECT PIPE COUPLING

FIELD OF THE INVENTION

The invention is related to the products of polymeric compositions of unsaturated aliphatic hydrocarbons containing one 'carbon-carbon' double linkage used in equipment during development and operation of hydrocarbons fields; in particular, to technology and methods of recovery of well products, process works in well, and transportation of well products and other fluids and gas. It can be used in oil and gas industry, in other technical industries at pumping of highly pressurized aggressive fluids and gas.

BACKGROUND

There is a device for internal protection of smooth pipe joints and those of flanged pipe connections from aggressive substances within. It includes a sleeve (one or several) installed inside the pipe, and has seals interacting with end surfaces of the internal protective cover or internal lining of the pipe. The sleeve enables to join separate sections of the pipe preventing effect of the pumped medium on the internal surface and, therefore, its corrosion (U.S. Pat. No. 3,235,291, Feb. 15, 1966).

The drawback of this device is narrowing of the pipeline cross-section, complicated nature of the repeated assembly-disassembly of the joint and the need to replace the O-rings.

Use of polymeric coupling (RU 2389943, May 20, 2010) is known for insulation of the pipe joints in polymeric sheath for heat supply networks, water supply systems and oil pipelines. Such coupling, however, is not particularly reliable.

There is a protective device for internal taper thread of pipe couplings of oil pipes grades (RU 2135882, 27, Oct. 1999) in the form of protective flared sleeve of foaming polymer, e.g. of polystyrene. The outer diameter (hereinafter referred to as "OD") of the sleeve is made larger than the inner diameter (hereinafter referred to as "ID") of the thread being protected by the value allowing elastic compression of the sleeve material.

By technical essence, the closest is the device providing insulation of the internal surface of the threaded coupling to connect two pipes, including stepped sleeve with the middle section of increased diameter and two end sections with smaller outside diameters installed between the ends of the pipes with tapered thread and connected with the coupling, having O-rings of elastomer plastics located at the sections of the sleeve with smaller diameter (U.S. Pat. No. 5,470,111, Nov. 28, 1995).

The drawback of this device is narrowing of the pipeline flow area near the coupling and unreliable performance of the O-rings installed on the smaller diameter section and interacting with the sealing surfaces in three planes. This device does not compensate wear of the couplings tapered threads at their frequent screwing and unscrewing, which is common during operation of the column tubing strings in oil and gas wells. This leads to seal failure and entering of the aggressive fluid into the gap. Besides, installation of such devices requires individual adjustment of their axial sizes for each separate connection.

SUMMARY

The present invention solves the task of insulation of the internal surface of the coupling and ends of their screwed pipes, and also exclusion of the entering the pumped fluid into the tapered thread connection at various stages of its operation in case of mechanical wear of the threads due to screwing and unscrewing during well development; it further improves hydraulic specifications due to reduction of wall friction and exclusion of fluid flow turbulence in the pipe joint section.

The technical result obtained at the use of the invention is prolongation of a threaded coupling connection service life due to elimination of corrosion of the coupling itself, its thread and adjoining pipe threads, as well as due to reduction of power losses for products transportation.

The technical result is achieved by way that the polymeric (plastic) or other material device protecting the pipe coupling contains a stepped bushing with the middle section of increased diameter and two end sections with smaller outside diameters installed between the ends of the pipes with tapered thread and connected with the coupling, having O-rings of elastomer plastics located at the sections of the bushing with smaller diameter, differing in that the device is equipped with an additional stepped bushing, the first stepped bushing having constant OD and two sections with small and large IDs, and the second stepped bushing has constant ID and two sections with small and large diameters, whereas the smaller ID of the first bushing and the ID of the second bushing are equal to the IDs of the connected pipes, and the OD of the first bushing and the larger OD of the second bushing are equal to the ID of the connecting coupling 'in the clear'; the first bushing at the section of the larger ID is connected with the section of the smaller OD of the second bushing with standoff, and the value of possible shift of the bushings relative to each other exceeds shift of the pipe ends at tightening of the threaded connection.

Besides, the polymeric device is characterized by the fact that the surfaces the interaction of the first and the second bushings occurs on may have spiral annular ridges and troughs of semicircular profile providing their tight contact and preventing their detachment during disassembly of the threaded connection.

In a particular embodiment, the invention belongs to products made of compositions of polymers unsaturated aliphatic hydrocarbons containing one carbon-carbon double linkage, which are used in equipment for the development and operation of hydrocarbon deposits. The polymeric device for protection of the connecting pipe coupling contains a stepped bushing having a medium part with an increased diameter and two lateral parts with a smaller outside diameters, which is installed between end faces of pipes with a conic thread, and connected by means of a coupling and having sealing rings made of an elastomer, which are on parts of the bushing with the small diameter. The device has an additional stepped bushing, and the first stepped bushing has a constant outside diameter and two parts with small and large internal diameters, and the second stepped bushing has a constant internal diameter and two parts with small and large diameters, and the small internal diameter of the first bushing and the internal diameter of the second bushing are equal to the internal diameter of pipes connected, and the outside diameter of the first bushing and the large outside diameter of the second bushing are equal to the internal diameter of the connecting coupling in clear, and the first bushing, in the part of the large internal diameter, is united with the part of the small outside diameter of the second bushing with an interfering contact, and the value of the possible displacement of the bushings relative to each other exceeds the displacement of the pipe ends when tightening the thread connection.

In one embodiment, the interacting surfaces of the first and the second bushings may be smooth on their whole length. In another embodiment, one of the bushings may be made of the material having smaller elastic modulus than the first one. In yet another embodiment, one of the bushings may be made of high-pressure polyethylene, another one—of low-pressure polyethylene. In still another embodiment, one of the bushings may be made of polycaprolactam, and another—of polyethylene.

BRIEF DESCRIPTION OF THE FIGURES

FIG. 1 provides the structural layout of an embodiment of the device.

The invention is realized as follows:

The pipe coupling 1 serves to connect two pipes 2 and 3 (e.g. tubing strings) having tapered threads at their ends. The internal surface of the pipes 2 and 3 may have protective coating providing their insulation from aggressive media. The internal coating of the pipes may be:
lacquer,
enamel,
glass,
epoxy resin.

There are two stepped bushings in the internal cavity of the coupling. The first stepped bushing 4 has constant outside diameter $O_d$ and two sections with small $d_1$ and large $d_2$ internal diameters; the second stepped bushing 5 has constant internal diameter $d_1'$ and two sections with small $d_2'$ and large $O'_d$ diameters, whereas the small internal diameter of the first bushing $d_1$ and the internal diameter $d_1'$ of the second bushing are equal to the internal diameter of the pipes being connected $d_{int}$, the outside diameter of the first bushing $O_d$ and the larger outside diameter $O_d'$ of the second bushing are equal to the internal diameter of the coupling 'in the clear'; the first bushing at the section of the larger internal diameter is connected with the section of the smaller outside diameter of the second bushing with standoff, and the value of possible shift of the bushings relative to each other exceeds shift of the pipe ends at tightening of the threaded connection at maximally allowed value of the threads wear.

The surfaces 6 and 7 where the interaction of the first 4 and the second 5 bushings have spiral annular ridges and troughs e.g. of semicircular profile providing their tight contact and preventing their detachment during disassembly of the threaded connection, i.e. at unscrewing of one of the pipes 2 (3) out of the coupling 1.

The option of the structure implementation would be manufacture of the bushings 4 and 5 with smooth surfaces 6 and 7 to interact along the whole length. At that the sizes of the contacting surfaces are manufactured in such a way as to provide standoff.

Independently of the bushings 4 and 5 design, one of them may be made of the material having smaller elastic modulus than the first one.

The device operates as follows:

Prior to assembly of the coupling connection, the coupling 1 is to be screwed on one of the pipes, e.g. the right one 2, and tightened with the torque ensuring sealing of the connection. Then the pre-assembled bushings 4 and 5 are installed into the internal cavity of the coupling 1. The right bushing 5 is installed in the opening of the left bushing 4 at the depth of about 5-10 mm, (depending on the diameter of the bushings) in such a manner that they would make a single assembly.

If necessary, the thread is pre-lubricated with grease or sealant—depending on the operating conditions of the threaded connection.

Then, the pipe 3 is screwed in the coupling 1. Screwing of the tapered threads consists of two stages—the actual screwing and further tightening of the threaded connection. During screwing the end of the pipe 3 props against the end of the bushing 5 and shifts it relative to the bushing 4. At the same time the surfaces of the bushings 5 and 6 slide relative to each other, the annular ridges of one bushing interact with the troughs of another bushing which provides for tight sealed connection. In case the surfaces of the bushings 6 and 7 are made smooth, the sealing of the gap is provided due to standoff.

When the thread is tightened, the final embedding of the bushing 5 into the bushing 4 takes place, and the values of the gap becomes that determined for existing wear of tapered threads. Thus, there is no adjustment of the axial sizes of the bushings, for these are self-set relative to each other.

When unscrewing of the threaded connection one of the pipes is unscrewed, and the bushings 4, 5 remain in the cavity of the coupling 1 due to friction forces. If necessary the bushings can be removed from the coupling cavity with a tool capturing the bushings at their ID. Separation of the bushings is after they have been removed out of the coupling by rotation relative to each other.

Since tubing strings are laid on the scaffolding in strict order while the column is raising, when lowering them down into the well the unscrewed pair of the parts 'coupling-pipe' will be re-assembled. As a result of wear of the threaded connection surfaces the end of the pipe 3 will be positioned deeper in the coupling 1 then at the previous connection. Therefore, the bushing 5 would be embedded deeper into the bushing 4 providing full joint with the end of pipe 3.

In process of wear and tear of the threaded cone connection, pipe 3 will be deeper and deeper screwed into the coupling, and bushing 5 will be deeper and deeper enter the opening of bushing 4. At the same time, the tightness at the end face of pipe 3 will be constant, or at least no smaller than the tightness at the initial stage, and will ensure leak-tightness of the connection.

In case of limiting wear of the thread, (this value is to be determined by practical consideration based on the experience of operation of threaded pipe joints) the value of gap will take the minimum value close to zero. During the whole service life period of the thread connection, the suggested device will ensure isolation of the internal surface of the coupling and threads against any liquid or gas which is in the internal cavity of pipes.

In such a way, the declared technical result consisting in increasing durability of the thread union joint during the whole service life period due to excluding corrosion of the coupling, its thread, and pipeline threads connected thereto.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

The invention claimed is:

1. A device for protection of a pipe-connecting coupling, the device comprising:
   a first stepped bushing having a large internal diameter part, a small internal diameter part with an internal diameter smaller than the large diameter part, and having a constant outer diameter;
   a second stepped bushing having a constant internal diameter, a large outer diameter part, and a small outer diameter part with a diameter smaller than the large outer diameter part;
   the two bushings being installed between end faces of pipes with a conic thread, the pipes connected via the thread to a coupling;
   wherein the small internal diameter part of the first bushing and the internal diameter of the second bushing are equal to each other and to an internal diameter of the pipes, and wherein the outer diameter of the first bushing and the large outer diameter part of the second bushing are equal to each other and to an internal diameter of the coupling;
   wherein the first bushing large internal diameter part is connected to the second bushing small outside diameter part by having an overlapping and frictional contact;
   wherein the value of possible lengthwise displacement of the bushings relative to each other is greater than the displacement of the pipe ends when tightening a threaded connection of the pipes; and
   wherein the first bushing large internal diameter part and the second bushing small outside diameter part each have projections, which are spiral annular projections with a semicircular shape on their faces, these projections are configured to interface during connection of the two bushings, while preventing their separation when disassembling the threaded connections of the pipes.

2. The device of claim 1 wherein one of the bushings is formed from a material having a smaller modulus of elasticity than the other bushing.

3. The device of claim 2 wherein one of the bushings is formed of high-pressure polyethylene, and wherein the other bushing is made of low-pressure polyethylene.

4. The device of claim 2 wherein one of the bushings is made of polycaprolactam, and the other bushing is made of polyethylene.

5. A device for protection of a pipe-connecting coupling, the device comprising:
   a first stepped bushing having a large internal diameter part, a small internal diameter part with an internal diameter smaller than the large diameter part, and having a constant outer diameter;
   a second stepped bushing having a constant internal diameter, a large outer diameter part, and a small outer diameter part with a diameter smaller than the large outer diameter part;
   the two bushings being installed between end faces of pipes with a conic thread the pipes connected via the thread to a coupling;
   wherein the small internal diameter part of the first bushing and the internal diameter of the second bushing are equal to each other and to an internal diameter of the pipes, and wherein the outer diameter of the first bushing and the large outer diameter part of the second bushing are equal to each other and to an internal diameter of the coupling;
   wherein the first bushing large internal diameter part is connected to the second bushing small outside diameter part by having an overlapping and frictional contact;
   wherein the value of possible lengthwise displacement of the bushings relative to each other is greater than the displacement of the pipe ends when tightening a threaded connection of the pipes; and
   wherein the first bushing large internal diameter part and the second bushing small outside diameter part each have projections, which are spiral annular projections with a semicircular shape on their faces, these interfaced projections connecting the two bushings, while preventing their separation when disassembling the threaded connections of the pipes from the coupling, wherein the interfaced spiral annular projections allow a shiftable connection of the two bushings, the two bushings shiftable from a first assembly position to a second assembly position by movement of the spiral annular projections of each of the two bushings over each other upon application of a force by at least one end face of the pipes.

6. The device of claim 5 wherein one of the bushings is formed from a material having a smaller modulus of elasticity than the other bushing.

7. The device of claim 6 wherein one of the bushings is formed of high-pressure polyethylene, and wherein the other bushing is made of low-pressure polyethylene.

8. The device of claim 6 wherein one of the bushings is made of polycaprolactam, and the other bushing is made of polyethylene.

* * * * *